United States Patent
Wistuba et al.

[11] Patent Number: 5,815,542
[45] Date of Patent: Sep. 29, 1998

[54] DEVICE FOR COLLECTING REACTOR-MELTDOWN PRODUCTS FROM A REACTOR PRESSURE VESSEL

[75] Inventors: Lothar Wistuba, Herzogenaurach; Gerhard Hau, Albstadt; Josef Hollmann, Schlüsselfeld, all of Germany

[73] Assignee: Siemens Aktiengesellschaft, Munich, Germany

[21] Appl. No.: 569,685

[22] Filed: Dec. 8, 1995

Related U.S. Application Data

[63] Continuation of PCT/DE94/00615 Jun. 1, 1994.

[30] Foreign Application Priority Data

Jun. 8, 1993 [DE] Germany ............... 43 19 093.6

[51] Int. Cl.⁶ .................................................. G21C 9/016
[52] U.S. Cl. .............................................. 376/280; 376/284
[58] Field of Search .................................. 376/280, 284

[56] References Cited

U.S. PATENT DOCUMENTS

| | | | |
|---|---|---|---|
| 4,045,284 | 8/1977 | Rosewell | 376/280 |
| 5,402,456 | 3/1995 | Schabert et al. | 376/280 |

FOREIGN PATENT DOCUMENTS

| | | |
|---|---|---|
| 0 392 604 | 10/1990 | European Pat. Off. |
| 2 683 375 | 5/1993 | France . |
| 29 25 680 | 10/1980 | Germany . |
| 28 40 086 | 9/1981 | Germany . |
| 39 38 111 | 6/1990 | Germany . |
| 85/00921 | 2/1985 | WIPO . |

OTHER PUBLICATIONS

Publ. World Scientific Jul. 1989, (Möllendorf et al.) pp. 19–23, "Emerging Nuclear Energy System 1989".

*Primary Examiner*—Daniel D. Wasil
*Attorney, Agent, or Firm*—Herbert L. Lerner; Laurence A. Greenberg

[57] ABSTRACT

A device for collecting reactor-meltdown products from a reactor pressure vessel includes an antechamber disposed below the reactor pressure vessel, an expansion chamber having a floor forming an expansion surface for reactor-meltdown products, and a bulkhead being disposed between the antechamber and the expansion chamber and being destructible by the reactor-meltdown products. The bulkhead has a plurality of parts including at least one part being thermally destructible by the reactor-meltdown products. The at least one part is joined to the other parts for clearing a flow path for the reactor-meltdown products from the antechamber into the expansion chamber upon a destruction of the at least one part.

64 Claims, 10 Drawing Sheets

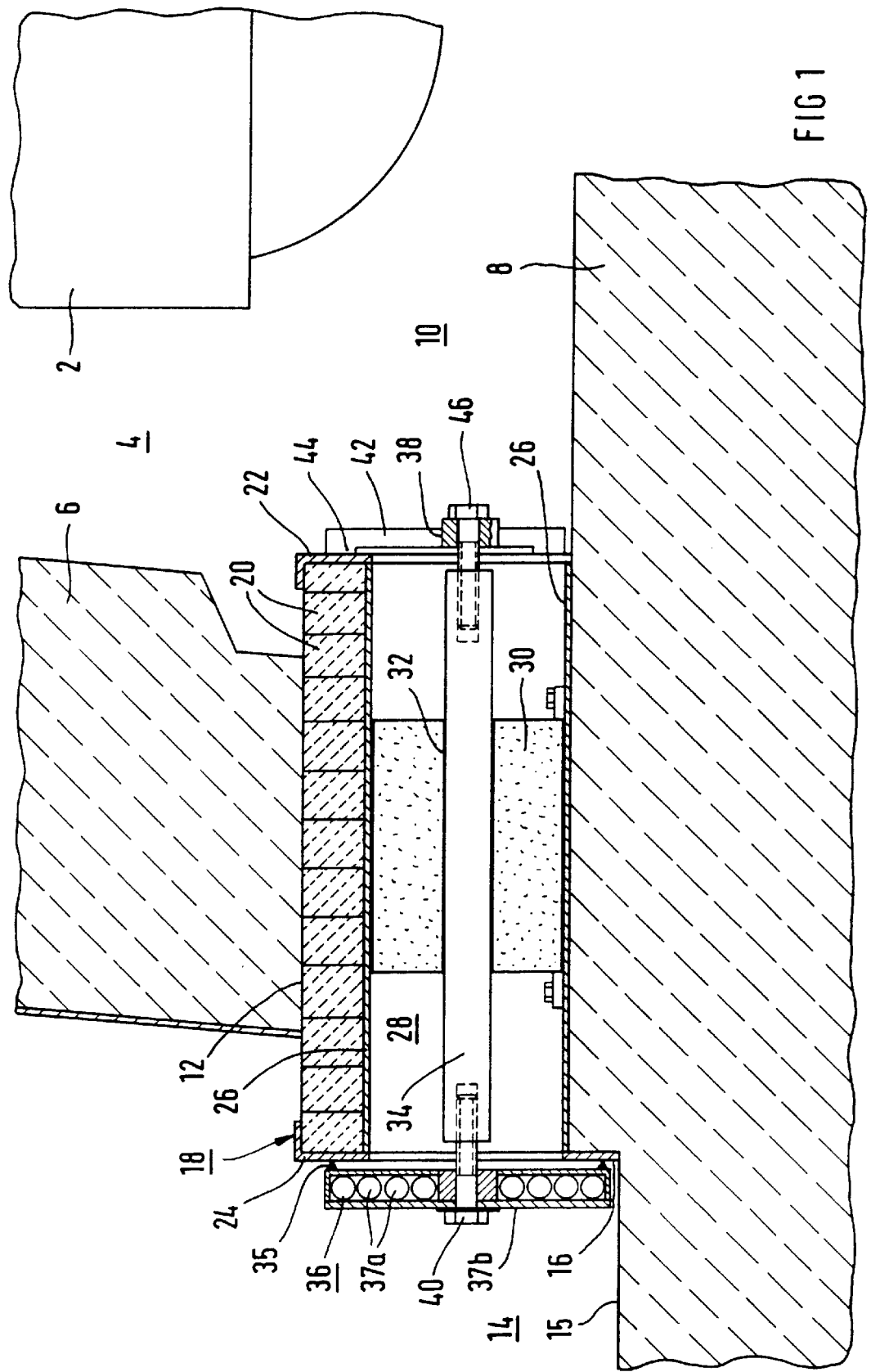

DEVICE FOR COLLECTING REACTOR-MELTDOWN PRODUCTS FROM A REACTOR PRESSURE VESSEL

CROSS-REFERENCE TO RELATED APPLICATION

This application is a Continuation of International Application Ser. No. PCT/DE94/00615, filed Jun. 1, 1994.

BACKGROUND OF THE INVENTION

FIELD OF THE INVENTION

The invention relates to a device for collecting reactor-meltdown products from a reactor pressure vessel, having an antechamber disposed below the reactor pressure vessel, an expansion chamber having a floor forming an expansion surface for the reactor-meltdown products, and a bulkhead being disposed between the antechamber and the expansion chamber and being able to be destroyed by the reactor-meltdown products.

The device is usable particularly in the EPR pressurized water reactor.

In nuclear reactors, safety considerations so far have assumed that failure of the reactor pressure vessel need not be feared, because of the choice of material and the dimensions. Recently, however, in the course of more-intensive safety investigations of nuclear energy utilization, the situation in which a reactor pressure vessel "fails", however unlikely that may be, has also been studied. In particular, a new reactor type, the European pressurized water reactor EPR, has been based on such considerations. In contrast to the safety philosophy followed heretofore, in that reactor type a nuclear meltdown accident, which is a so-called MCA (Maximum Credible Accident), is not flatly excluded as a possibility. Investigations have also been made as to whether or not steam explosions might occur during a core meltdown, and whether or not the water vapor suddenly produced in such a critical phase might not cause the pressure vessel to collapse. There is no question that such accidents, however theoretical they might be, must be made controllable.

In a hypothetical serious accident in a nuclear power plant with a water-cooled reactor, it is accordingly assumed that the reactor core will melt. Subsequently, the reactor-melt or reactor-meltdown products escape from the floor of the reactor pressure vessel into the shielding pit of the reactor containment. In order to enable controlling such an accident, suitable structural provisions must be made to prevent the meltdown products, possibly escaping at excess pressure from the reactor pressure vessel and collecting in the region of the floor of the nuclear reactor plant, from causing failure of the containment.

A nuclear reactor plant which is known from German Patent 28 40 086, corresponding to UK Patent Application GB 2 030 347 A, for instance, has a collecting device for a reactor core that is melting down. A vertical drain channel is provided below the shielding pit surrounding the reactor pressure vessel. The drain channel passes through the containment and leads into a meltdown pit disposed below the containment. There the reactor-meltdown products emerging from the reactor pressure vessel are distributed over an absorber bed formed by a steel tub filled with water-free materials. After the steel tub melts, the meltdown products reach the floor of the meltdown pit. The floor and the side walls of the meltdown pit are water-cooled, and thus the meltdown products gradually solidify.

In the nuclear reactor plant known from German Patent 29 25 680, corresponding to UK Patent Application GB 2 052 133 A, a collecting tub for receiving the meltdown products is also provided and is located below the level of the reactor foundation. The collecting tub is not located directly below the reactor core but rather is located next to it and is connected to the floor of the reactor building through a chute that ends horizontally above the collecting tub.

A collecting device for reactor-meltdown products is known from FIG. 1 of the publication entitled Emerging Nuclear Energy Systems 1989, Icenes 89, Karlsruhe, July 3–6, Proceedings of the Fifth International Conference on Emerging Nuclear Systems, pages 19–24. In that device, a cooled collecting tub is disposed inside the containment directly beneath the reactor pressure vessel, and in that tub the meltdown products spread out over a large area and can cool down in direct contact with water.

Published European Patent Application 0 392 604 A1, corresponding to U.S. Pat. No. 5,057,271, discloses a collecting and cooling device in which the water inlet is located beneath the reactor pressure vessel. In the case of a meltdown, the reactor-meltdown products and portions of the reactor pressure vessel and its built-in fixtures would drop directly into the water bath. From the standpoint of effective cooling and the aversion of steam explosions, that is not expedient. What is sought is instead a cooling process in which the outflowing reactor-meltdown products will not meet a relatively large quantity of water.

German Published, Non-Prosecuted Patent Application DE 43 19 094 A1, corresponding to Published International Application WO 94/29876 and to U.S. Application Serial No. (Attorney's Docket No. GR 93 P 3291), entitled "Device and Method for Collecting and Cooling Reactor-Meltdown Products", discloses a device of the type referred to at the outset, and especially a core retention device, operating on the expansion principle, in which in the event of failure of the reactor pressure vessel the forcefulness of steam production caused by contact between the reactor-meltdown products and any water that is present is considerably reduced or even averted entirely. That device is equipped with a) an antechamber disposed below the reactor pressure vessel, b) an expansion chamber for the reactor-meltdown products, c) a channel between the antechamber and the expansion chamber, that is provided with a bulkhead which can be destroyed by the reactor-meltdown products, and d) a coolant reservoir which is connected to the expansion chamber through a closure element that can be destroyed by the reactor-meltdown products.

Such a bulkhead between the antechamber and the expansion chamber is also already shown in FIG. 4 of Published European Patent Application 0 563 739 A1 and B1, corresponding to U.S. Pat. No. 5,402,456. It includes a thin steel plate and it partitions off the outlet of the antechamber to a drain channel in the direction of the expansion chamber until it is destroyed by the heat of the meltdown products. The expansion chamber in that case is especially already filled with coolant when the reactor-meltdown products enter.

The current EPR concept assumes that the expansion chamber is dry under operating conditions. However, it should also be assured that the bulkhead ensures leakage-proofness or intactness against water from the expansion chamber which might have been flooded as a result of an accident, causing the water to invade the antechamber and thus flow into the dry reactor pit. Moreover, leakage-proofness should be assured in the event of earthquakes and pressure waves of bleeding. Finally, replaceability of the bulkhead during recurrent inspections must also be possible from the side of the expansion chamber.

Some demands must be made of the bulkhead from the reactor side as well. The outlet opening from the antechamber in the direction of the expansion chamber should be opened quickly and securely by the contact with the reactor-meltdown products. Free passage of the reactor-meltdown products through the outlet opening should also be assured. Moreover, there is a demand for leakage-proofness even at a pressure of about 20 bar in the reactor pit. Preferably, there should be radiation absorption and neutron absorption in the bulkhead as well, because the systems rooms should be accessible by workers. Finally, the bulkhead should have a certain long-term durability, which at present is assumed to be about 60 years.

SUMMARY OF THE INVENTION

It is accordingly an object of the invention to provide a device for collecting reactor-meltdown products from a reactor pressure vessel, which overcomes the hereinafore-mentioned disadvantages of the heretofore-known devices of this general type, in such a way that a bulkhead is destroyed quickly and reliably upon contact with reactor-meltdown products and a free passage of the reactor-meltdown products through a thus-formed outlet opening is assured.

With the foregoing and other objects in view there is provided, in accordance with the invention, a device for collecting reactor-meltdown products from a reactor pressure vessel, comprising:

a) an antechamber disposed below a reactor pressure vessel;
b) an expansion chamber having a floor forming an expansion surface for reactor-meltdown products; and
c) a bulkhead being disposed between the antechamber and the expansion chamber and being destructible by the reactor-meltdown products, the bulkhead having a plurality of parts including at least one part being thermally destructible by the reactor-meltdown products and other parts, the at least one part being joined to the other parts for clearing a flow path for the reactor-meltdown products from the antechamber into the expansion chamber upon a destruction of the at least one part.

The aforementioned one part is thus the tripping element for the destruction of the entire bulkhead. This destruction can proceed largely automatically in concept, under the influence of gravity, as well as under the influence of the advancing reactor-meltdown products, by way of example.

Other features which are considered as characteristic for the invention are set forth in the appended claims.

Although the invention is illustrated and described herein as embodied in a device for collecting reactor-meltdown products from a reactor pressure vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE INVENTION

FIGS. 1, 1a and 1b are fragmentary, diagrammatic, longitudinal-sectional views of a first device for collecting reactor-meltdown products from a reactor pressure vessel, having a bulkhead with multiple parts, including a fusible screw as a tripping element, between an antechamber and an expansion chamber;

DESCRIPTION OF THE PREFERRED EMBODIMENTS

Figure 1A:
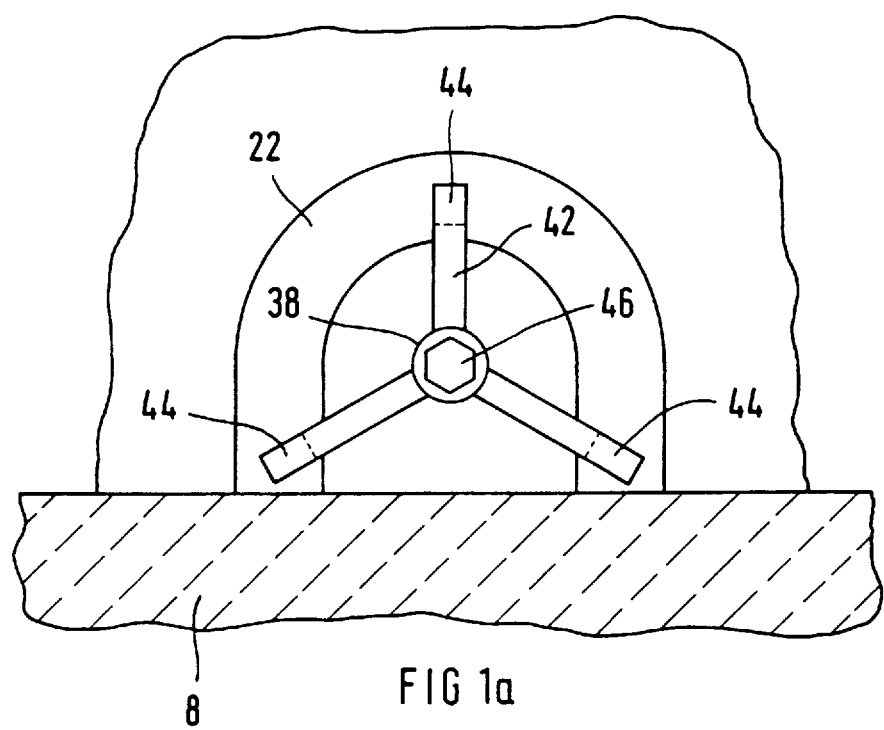
Figure 1B:
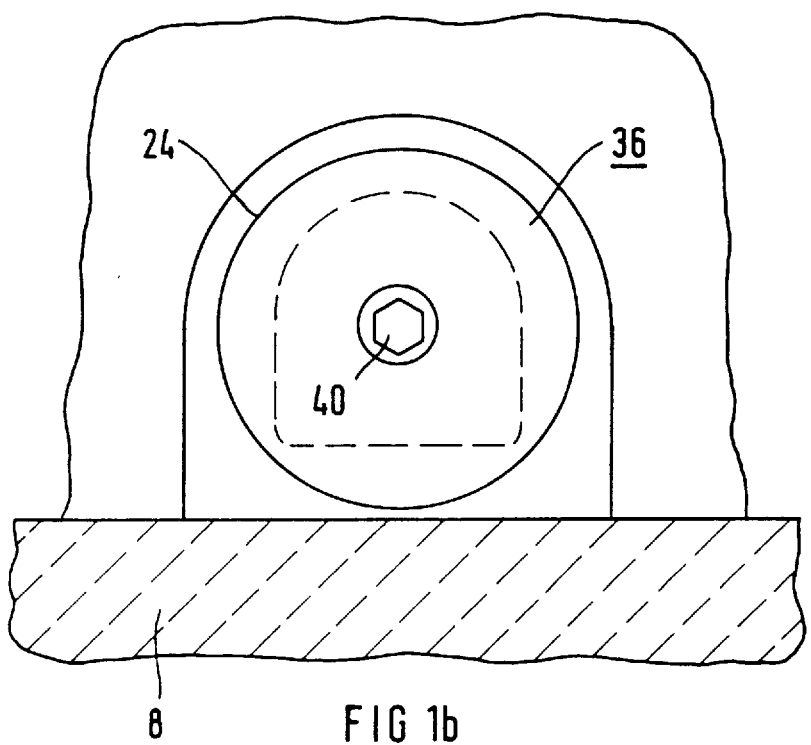

Referring now in detail to the figures of the drawing, in which the same reference numerals are used for the same or similar components, and first, particularly, to FIG. 1 thereof, there is seen a reactor pressure vessel 2 which is disposed in a reactor containment of a nuclear reactor facility. The reactor pressure vessel 2 is supported by a concrete structure surrounding it in a shielding pit 4. A portion of a wall that surrounds the reactor pressure vessel 2 is indicated as a load-bearing shield 6. A floor 8 of the shielding pit 4 is formed of a fireproof protective layer or in particular a fireproof concrete base. The floor 8 may also be formed of some other material, for instance a fire-proof ceramic or special stone. The floor 8 prevents reactor-meltdown products from being able to eat their way through underneath it. The reactor pressure vessel 2 is shaped cylindrically in an upper portion, whereas in a lower portion it has a spherical calotte. A hypothetical accident scenario assumes that this spherical calotte can tear open or tear off, so that reactor-meltdown products located in the reactor pressure vessel 2 will pour into the shielding pit 4.

A lower portion of the shielding pit 4, in which the spherical calotte of the reactor pressure vessel 2 is located, will be referred to below as an antechamber 10. If the calotte were to rip off, it would drop into the antechamber 10. In order to ensure that in such a severe accident situation the escaping reactor-meltdown products would at most meet with an only slight volume of water, non-illustrated provisions are made so that the antechamber 10 has only a small volume below the reactor pressure vessel 2.

A channel, aperture or connection 12 in the load-bearing shield 6 leads from the antechamber 10, in which the reactor-meltdown products appear first in the event of an accident, to an expansion chamber 14. It is important that this expansion chamber 14 be disposed laterally of and spaced apart somewhat from the reactor pressure vessel 2 and be kept dry in normal operation. In other words, the antechamber 10 is connected to the expansion chamber 14 through the connection 12 with an outlet opening for the reactor-meltdown products. The connection 12 is shown in this case as a horizontal channel. Preferably, however, it is inclined and drops downward toward the left. The connection 12 also has a floor that is formed of a fireproof protective layer, which extends inward into the expansion chamber 14. It is notable that a floor 15 of the expansion chamber 14, which forms an expansion surface, is provided with a downward-leading step 16 on the side of the expansion chamber 14.

A bulkhead or partition which is identified overall by reference numeral 18 and which can be thermally destroyed by the reactor-meltdown products, is located in the connection 12. The bulkhead or partition 18 is accordingly dimensioned in such a way that after a given period of time it is destroyed by the action of the reactor-meltdown products. This time period may amount to 20 to 30 minutes, for instance. The bulkhead or partition 18 is composed of a large number of parts, as will be described in further detail below. In the event of failure, that is if the reactor pressure vessel 2 begins to leak, it is intended to received residual pressure. This residual pressure may amount to 20 bar, for instance. It should resist the pressure and the temperature only until the predominant portion of the reactor core has been collected or recovered, in the form of reactor-meltdown products, in the lower portion of the reactor pit 4.

The connection 12 has a round or a rounded-rectangular cross section, for example. It has a height of 1 m and a width of 1.20 m, for instance. The thus-formed channel accordingly has a relatively large cross section, to enable an easy outflow of the reactor-meltdown products once the bulkhead 18 has been opened. A precipitous course of the connection 12 is preferred, so that a largely residue-free outflow of reactor-meltdown products from the antechamber 10 into the expansion chamber 14 is assured. The reactor-meltdown products follow the course of gravity in this case. The surface area of the expansion chamber 14 is 150 m$^2$, for example. Preferably, it is assured through the use of non-illustrated provisions that coolant water cannot flow into the expansion chamber 14 unless the reactor-meltdown products have already invaded it. This process is known as "dry expansion". In any event, it must be stressed that the bulkhead 18 is constructed in this case in such a way that it will reliably open upon the escape of reactor-meltdown products even if water has reached the expansion chamber 14 as a consequence of a malfunction, so that actually the danger could exist that cooling of the bulkhead 18 could occur, thus putting its melt-open property out of operation.

The upper portion of the connection 12 is lined with a fireproof masonry lining or protective layer 20, which protrudes at both sides of a load-bearing shield 6. The sides may also be lined with such a protective layer 20. This involves high-temperature-proof stones, in particular. As a result of the indicated choice of a nearly round or nearly square cross section, it is assured that the construction is self-supporting. As can be seen from the side view of FIG. 1a, an entrance to a (remaining) connecting channel or shaft 28 is covered by a reinforcing frame 22, which is formed of metal, for instance. This frame is horseshoe-shaped in this case.

A corresponding reinforcing frame or sealing flange 24 is mounted on the other end surface of the masonry lining 20. In this case, this sealing flange 24 is O-shaped. This O-shaped embodiment is possible because of the step 16. This is shown in the side view of FIG. 1b.

A lining 26 of a metal is located inside the masonry lining 20, thus producing the shaft 28. The shaft 28 can have the aforementioned dimensions. A serpentine granulate bushing or sheath 30 is located in a middle portion of this shaft 28. This bushing 30 may be provided for the sake of radiation protection. The bushing 30 serves to protect inspection workers who have entered the expansion chamber 14 from radiation from the shielding pit 4. The bushing 30 has a central longitudinal bore 32 formed therein. A tie rod 34 with threaded bores provided on both its end surfaces is passed through the longitudinal bore 32.

A round sealing cap 36 which is located inside the expansion chamber 14 is disposed upright and has an annular sealing surface 35 that rests on the sealing flange 24. This sealing cap 36 is firmly held in the position shown with the aid of the tie rod 34 and a countersupport 38 located on the other side. Preferably, the sealing cap 36 is constructed as a float body. To that end, the sealing cap 36 includes a number of thin-walled lengths of pipe 37a, which are disposed parallel to one another and are accommodated in a metal capsule or sheet-metal housing 37b. The sealing cap 36 is firmly held with the aid of a mounting screw 40 and together with a seal, in the left-hand end threaded bore of the tie rod 34.

The countersupport 38 may in particular be spider-shaped. In this case, as is shown especially clearly in FIG. 1a, it includes a tripod 42, which is braced by feet 44 thereof on the reinforcing frame 22. For securing purposes, a centrally disposed fusible screw 46 is provided, which is made of a thermally easily destroyed material. This fusible screw 46 is passed through the hub of the tripod 42 and screwed into the right-hand-end threaded bore of the tie rod 34. The fusible screw 46 thus acts as a thermal tripping element or tripping part. The fusible screw 46 is thermally destroyed by the reactor-meltdown products invading the antechamber 10, whereupon the other parts of the bulkhead 18 collapse and clear the way for the flow of the reactor-meltdown products. This will be described in even further detail below.

The expanding reactor-meltdown products accordingly melt open the fusible screw 46 in the tripod 42 of the countersupport 38. If there should be any water in the expansion chamber 14, the sealing cap 36, which is constructed as a float body, is then only held in its position by the prevailing water pressure and by the tie bar 34, which is preferably also made of fusible material. The reactor-meltdown products shooting to the left melt open the lower part of the serpentine granulate bushing 30 and the tie rod 34 guided therein. The upper portion of the serpentine granulate bushing 30 then floats upward. The reactor-meltdown products advancing onward toward the left then press the sealing cap 36 open and expand along the expansion surface of the floor 15 of the expansion chamber 14, which surface is located outside the load-bearing shield 6. Optionally, by using further provisions, water can also be caused to flow into the expansion chamber.

The device shown in FIG. 1 can thus be considered to be a retention device for reactor-meltdown products, with a sealing wall 18 that can melt open to form an outlet opening of the load-bearing shield channel 28.

Figure 2:
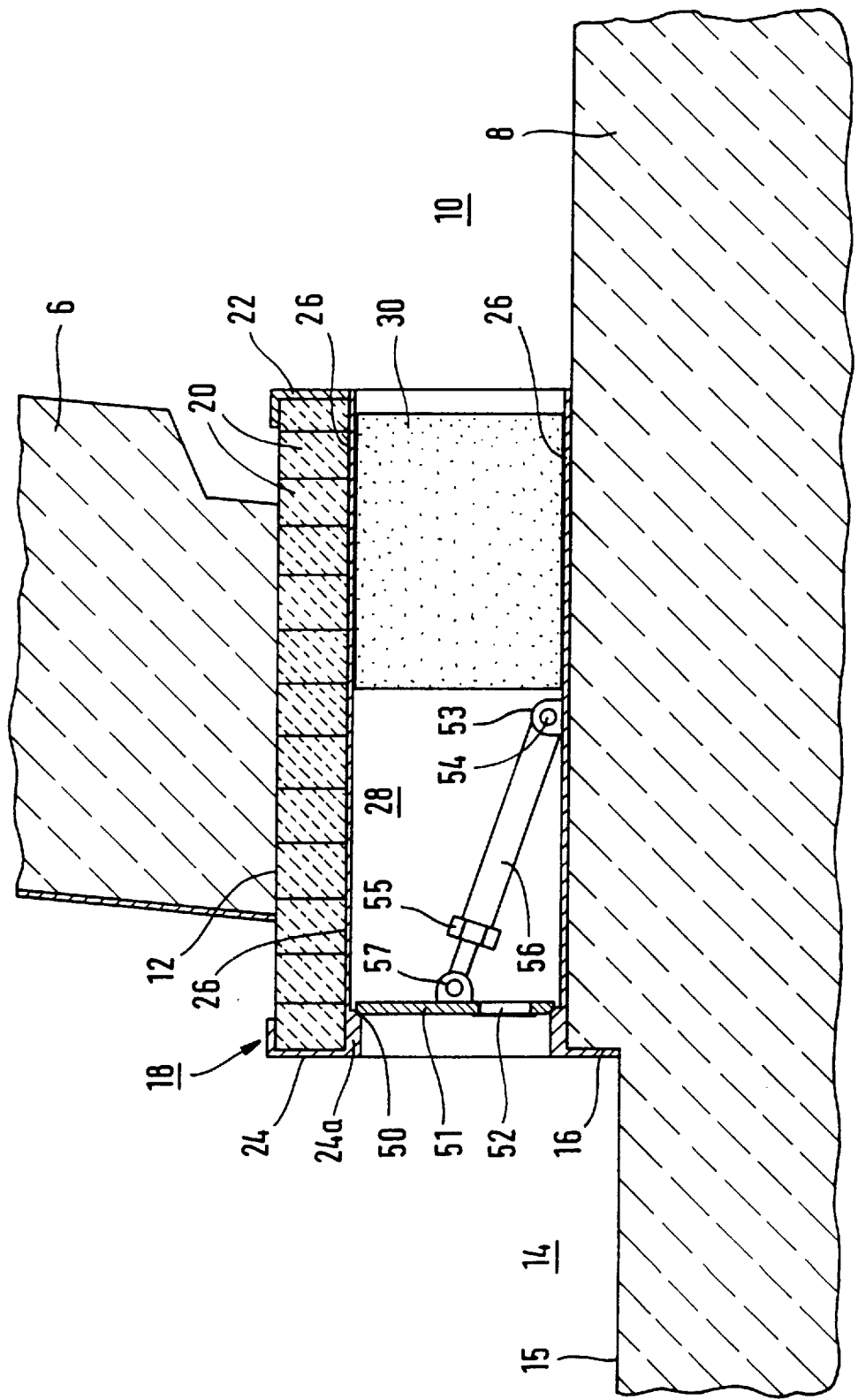
FIG. 2 is a view similar to FIG. 1 of a second such device, with a fusible bearing bolt as the tripping element.

In the device of FIG. 2, the structural layout of the load-bearing shield 6, the antechamber 10, the connection 12 and the expansion chamber 14 is largely equivalent to that of FIG. 1. Once again, there is a shaft 28 lined with a metal lining 26, in which a serpentine granulate bushing 30 is disposed, but in this case on the right-hand end. In FIG. 2, a portion 24a of the sealing flange 24 is retracted inward into the shaft 28, where its end forms a conical sealing surface 50. A round sealing cap 51 is pressed from inside against this sealing surface 50. This sealing cap 51 is provided with an actuation opening 52 outside the middle thereof.

A fusible bearing bolt 54 made of a relatively easily melted material is mounted approximately in the middle of the channel or shaft 28, crosswise to the lengthwise direction in the floor region, with the aid of two eyelets 53 which are welded to the lining 26. The fusible bearing bolt 54 is connected to a joint 57 on the inside of the sealing cap 51 through a pressure rod 56 that can be tightened by an actuating member 55. In particular, the actuating member 55 can be an actuating nut which serves to tighten and loosen the pressure rod 56. In the tightening situation, the cap 51 rests sealingly with its edge on the sealing surface 50 in the region of the connection 12 leading from the antechamber 10 to the expansion chamber 14. The fusible bearing bolt 54 between the two eyelets 53 then serves as a countersupport. The actuating member 55 can be controlled from the expansion chamber 14 through the opening 52.

In the event of failure, the spreading reactor-meltdown products melt open the lower part of the serpentine granulate bush 30, while the upper portion floats upward. The leakage-proofness between the sealing flange 24 and the sealing cap 51 is attained through tightening the pressure rod 56 against the countersupport, using the fusible bearing bolt 54. When the reactor-meltdown products that are present reach the melting temperature of the fusible bearing bolt 54, the action of the countersupport is cancelled out, and the pressure rod 56 is thrust into the reactor-meltdown products by the water pressure that may possibly be acting on the sealing cap 51. At the same time, the leakage-proofness is cancelled out, and the water that may be present can flow into the shaft 28 to cool the reactor-meltdown products. The inner end of the sealing flange 24 and the lining 26 serve as guides, which prevent canting or tilting of the sealing cap 51. The reactor-meltdown products creep beneath the possibly inflowing water, through the tipped-over sealing cap 51, onto the expansion surface 15 located outside the load-bearing shield 6. Tipping over of the cap takes place even if there is no water present outside the shaft 28 or in other words in the expansion chamber 14.

Figure 3:
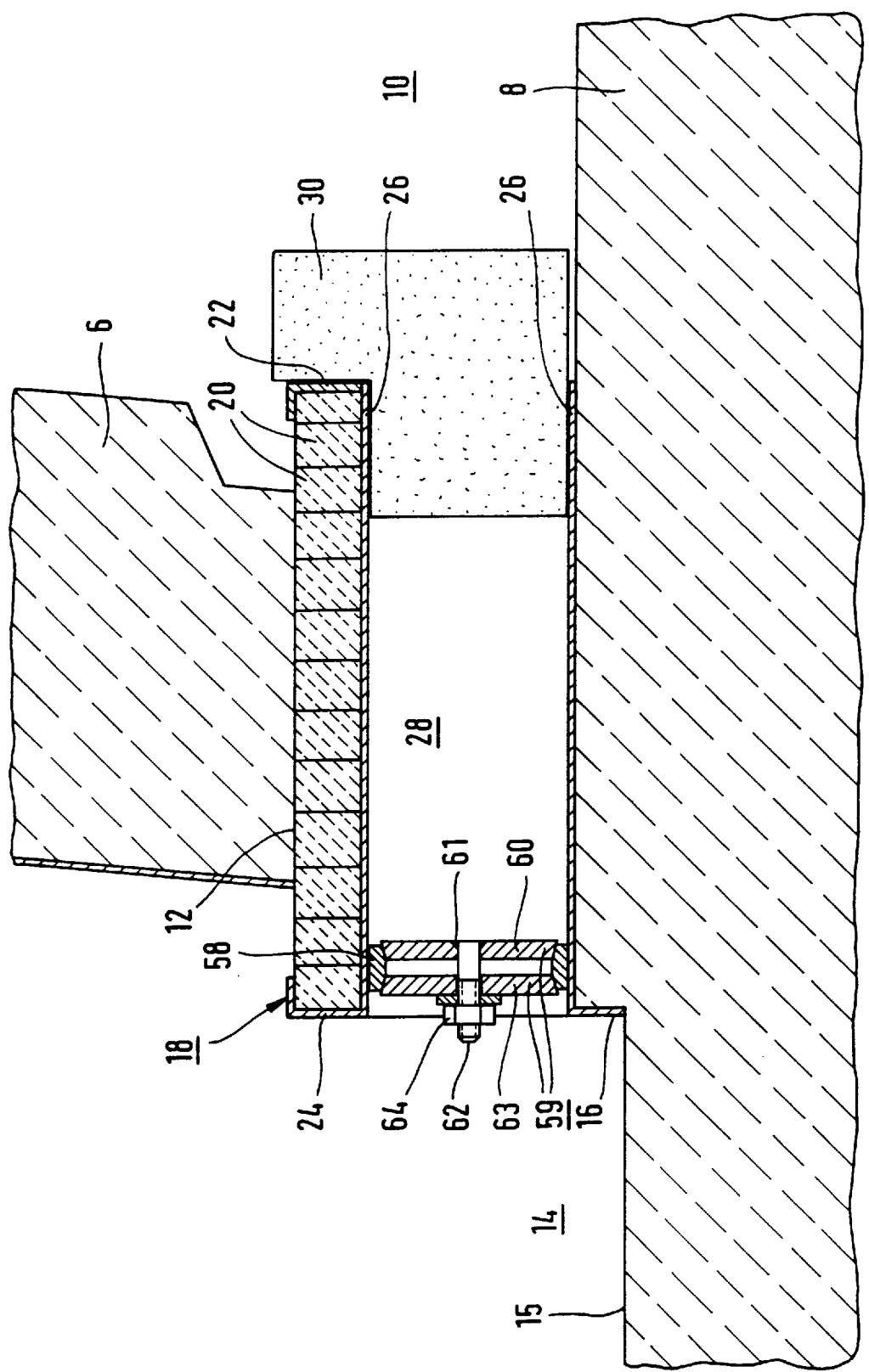
FIG. 3 is a view similar to FIG. 1 of a third such device, with a fusible seam located on a bolt as the tripping element.

FIG. 3 shows a third exemplary embodiment. Once again, the load-bearing shield 6 includes a channel or shaft 28, which is sealed off. In the present case, the serpentine granulate bushing 30 protrudes some distance out of the right-hand end of the shaft 28. The actual sealing off is accomplished with an approximately annular sealing body 58 and a tension body 59. The sealing body 58 rests on an inner surface at the left-hand end of the shaft 28. The tension body 59 includes a first cap 60, in the middle of which a leftward-pointing screw bolt 62 is welded in, through the use of a welding seam 61. The welding seam 61 is a fusible seam, or in other words it is formed of a relatively easily melting material. The bolt 62 is passed centrally through a second cap 63 that has an edge which likewise rests on the sealing body 58. The sealing body 58 once again is formed of a soft metal or a hard rubber. Preferably, it has a slightly conical profile, so that when a mounting nut 64, which may also have a seal, is tightened, complication-free fastening is achieved. To that end, edges of the two caps 60, 63 may also be beveled inward. Once the mounting nut 64 has been tightened, the edges of the caps 60, 63 are braced against the sealing body 58. As a result, the tension body 59 rests sealingly in the shaft 28. The two caps 60, 63 preferably are formed of a metal, such as steel.

In the present case, the tripping element is the fusible seam 61.

In the event of failure, the reactor-meltdown products expanding in the antechamber 10 melt open the lower part of the serpentine granulate bush 30. The upper portion floats upward. The leakage-proofness between the tension body 59 and the sealing body 58 has been attained by tightening the mounting nut 64 on the bolt 62 on the tension body 59. When the melting temperature at the fusible seam 61 is reached by the reactor-meltdown products which are present, the tension body 59 is broken apart into two pieces, namely the inner cap 60 on one hand and the outer cap 63 on the other hand. The inner cap 60 is first melted open or else it drops into the reactor-meltdown products. Next, the reactor-meltdown products push the outer cap 63 against the possibly operative water pressure, thereby causing this cap to drop into the reactor-meltdown products as a result of the water pressure. Once again, guides prevent any possible canting of the caps 60, 63. The reactor-meltdown products then creep below the possibly inflowing water, onto the expansion surface 15 located outside the load-bearing shield 6.

Figure 4:
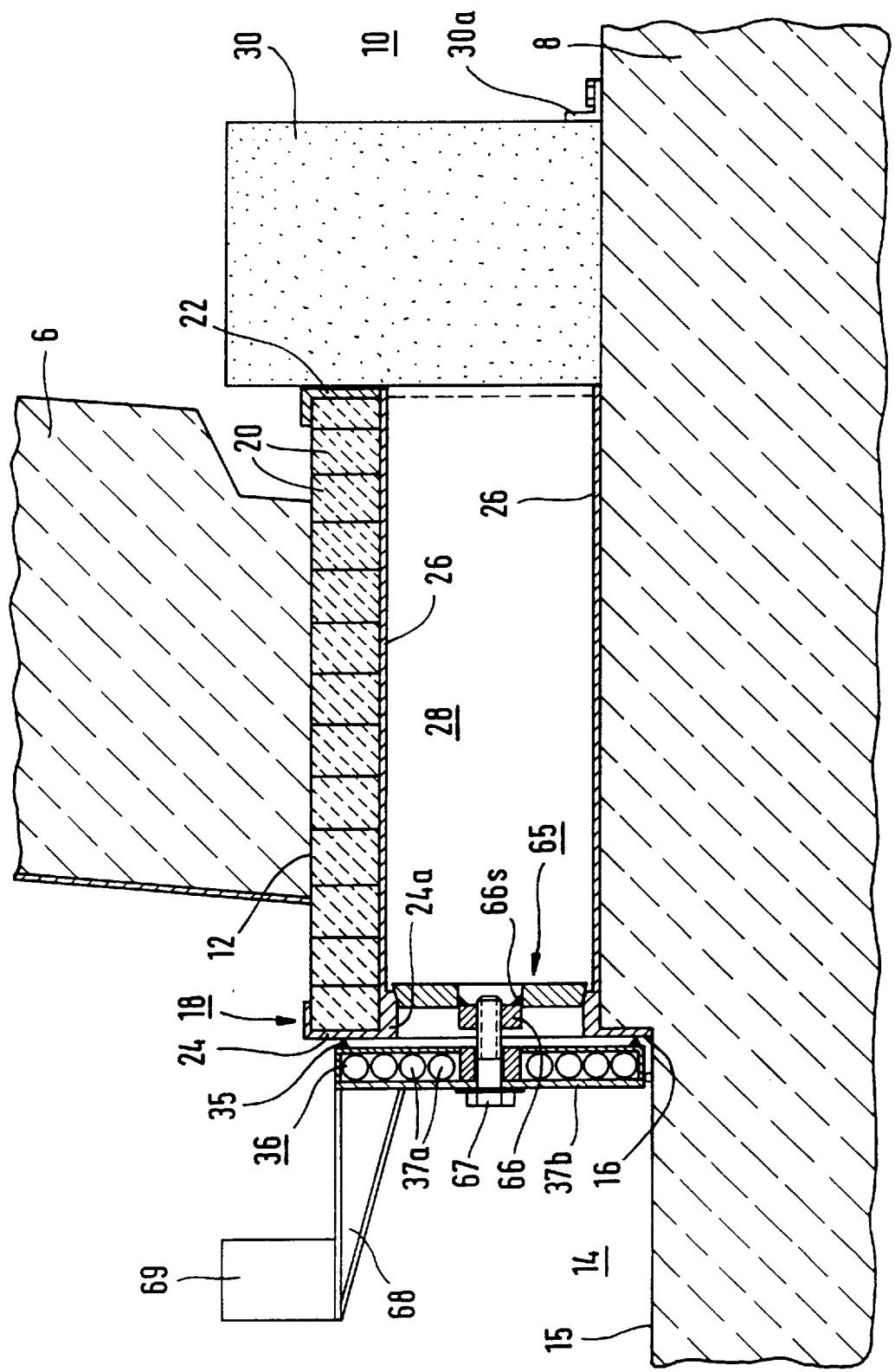
FIG. 4 is a view similar to FIG. 1 of a fourth such device, with a fusible sheath and/or fusible seam as the tripping element or elements.

In the embodiment of FIG. 4, a different closure is chosen for the shaft 28 as the bulkhead 18. This closure can again be eliminated with the aid of a thermally destroyable or destructible part or element. In FIG. 4, the bulkhead 18 includes a closing cap 65, which is connected to or contains a screw sheath 66. The closing cap 65 can be fastened sealingly in the shaft 28 through the use of the sheath 66. Either the sheath 66 is constructed as a fusible sheath, or the connection is constructed as a thermally readily destroyed weld seam or fusible connection 66s. A combination of these two provisions is also possible. A conical guidance of an edge of the closing cap 65 is preferably provided for sealing purposes. This edge is braced against the inward-retracted portion 24a of the sealing flange 24. This edge thus acts as an annular seal. In this instance, the centrally located portion of the closing cap 65 is preferably constructed as the fusible sheath 66.

In addition to the inner cap or closing cap 65 and the sheath 66, the bulkhead 18 has an additional cap 36 of the kind that was already described in conjunction with FIG. 1. This additional cap 36 is screwed to the sheath 66 together with a seal from outside, through the use of a mounting screw 67. The cap 36 has an upper portion on which a weight 69 is provided through a cantilevered arm 68. A sealing ring 35 of the cap 36 once again rests on the sealing flange 24. As in the embodiments of FIGS. 1–3, once again the configuration in this case is chosen in such a way that no forces are transmitted from the sealing wall 18 to the building structure.

In the present case, the serpentine granulate bushing 30 is accommodated entirely outside the shaft 28 in the antechamber 10, through the use of a floor holder 30a.

In the event of failure, the expanding reactor-meltdown products lift the serpentine granulate bushing 30, causing it to float. The reactor-meltdown products then flow into the outlet opening at the entrance to the shaft 28. The seal is constructed as a sealing and supporting bearing. The countersupport 65, 66 in this case is drawn onto the sealing flange 24 above the aforementioned cone. The fusible sheath 66 or the fusible seam 66s is integrated into the countersupport 65, 66 and is released from the countersupport 65, 66 if its melting temperature is exceeded by the reactor-meltdown products which are present. This causes the fastening, that is the mounting screw 67, to lift away from the sealing cap 36. The counterweight 69 secured to the sealing cap 36 assures that the sealing cap 36 will tip over and uncover the outlet opening, possibly counter to the pressure of the water located in the expansion chamber 14.

The countersupport tips over onto the reactor-meltdown products as a result of the water pressure acting in this case upon the countersupport 65, 66. Guides once again prevent possible canting of the countersupports 65, 66 in this case. The thickness of the countersupport 65, 66 is dimensioned in such a way that even upon contact with the reactor-meltdown products, the fusible sheath 66 is first dissolved or torn out before the closing cap 65 has melted through. The reactor-meltdown products then creep beneath the inflowing water, through or next to the tipped-over sealing cap 36, onto the expansion surface 15 located outside the load-bearing shield.

Figure 5:
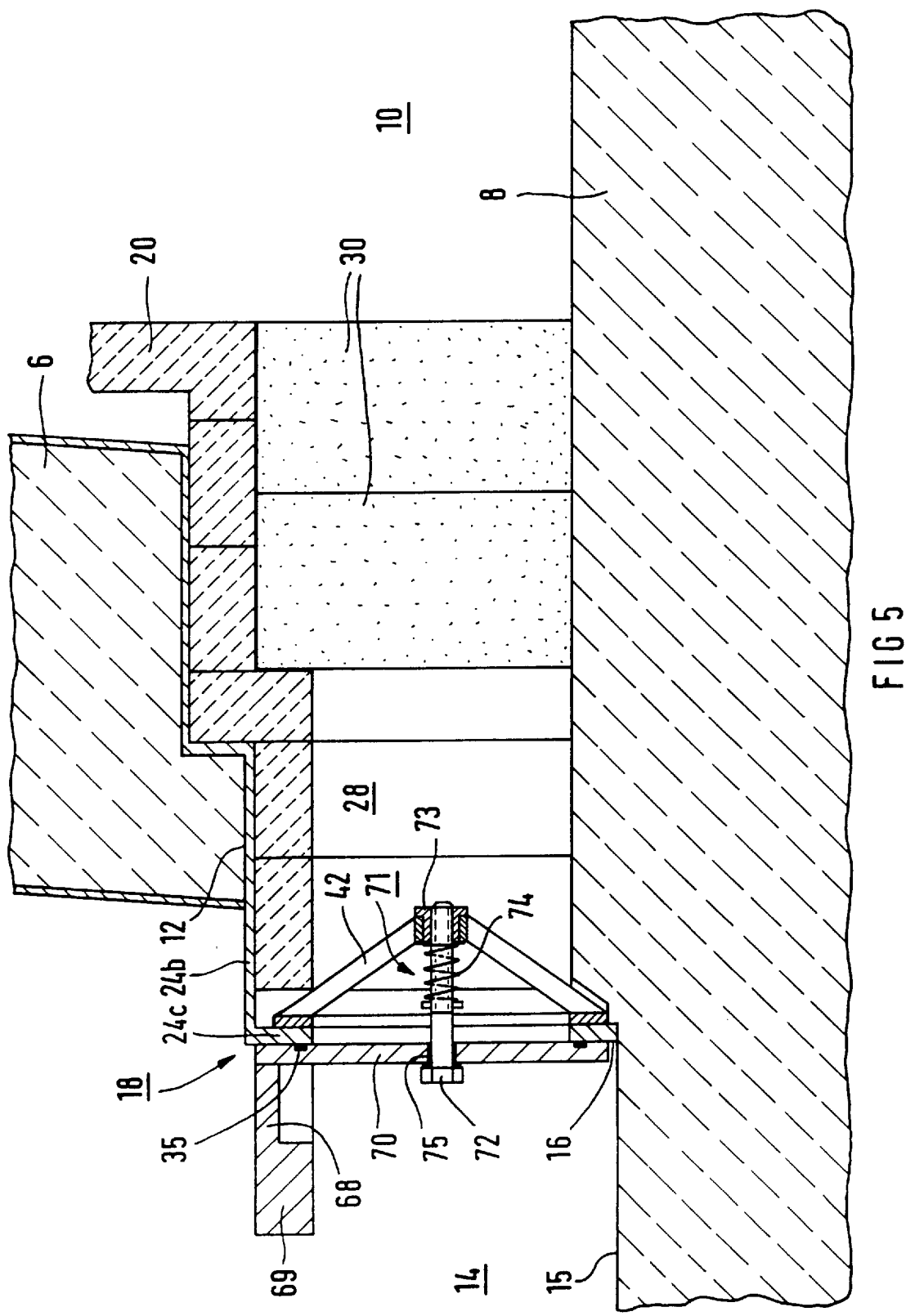
FIG. 5 is a view similar to FIG. 1 of a fifth such device, again with a fusible sheath as the tripping element.

In FIG. 5 an embodiment is shown in which a sealing flange or lining frame 24c is disposed on a lining 24b in the connection 12. The lining frame 24c in this case serves the purpose of liquid-tight sealing of the shaft 28. The bulkhead 18 in this case includes a cap 70, a countersupport 71 and a connecting element 72 having a fusible component 73. The connecting element 72 connects the cap 70 with the countersupport 71. The connection is constructed in such a way that the cap 70 is sealingly braced from outside against the sealing flange 24c, and the countersupport 71 is likewise braced from inside against the sealing flange 24c. The cap 70 is preferably a round metal plate, into which a sealing ring 35 is let in, in the region of the sealing flange 24c. The countersupport 71 in this case includes a tripod 42, of the kind that is already shown in FIG. 1. A fusible sheath with an internal thread is secured in the hub of this tripod 42 as the fusible component 73. The connecting element 72 has a centrally disposed bolt, which is screwed to the fusible sheath. In order to ensure that the fusible sheath 73 will not be pushed out of its position during inspection work, a spiral spring 74 is provided on the bolt. This spring 74 is braced against a bolt collar. In order to seal off the bolt of the connecting element 72 from the cap 70, a copper seal 75 may be used. Once again, the cap 70 is provided with a cantilevered arm 68, on which a weight 69 is mounted. The serpentine granulate bushing 30 is disposed on the right-hand side in a special partial chamber of the shaft 28. Both in the upper region and on both sides, this shaft 28 is provided with a masonry lining 20.

Accordingly, the following can be said about the embodiment of FIG. 5: the outlet opening on the side of the expansion chamber 14, on the channel side, has a tripod 42 braced at the edge of the opening and provided in its center with a fusible sheath as the fusible component 73. A preferably spring-loaded tension screw or a bolt is screwed into this fusible sheath and pulls the sealing cap 70 with the sealing ring 35 against the sealing flange 24c of the outlet opening.

Once the reactor-meltdown products have melted through the serpentine granulate double bushing 30, they reach the fusible sheath 73. As a result, the countersupport for the bolt in the connecting element 72 melts away, and the cap 70 drops off. The reactor-meltdown products can thus then pour into the expansion chamber 14.

In the embodiment of FIG. 6, once again a frame 24 is disposed at the connection 12. The frame 24 may have a U-shaped or L-shaped profile. A cap 76 which is especially constructed as a fusible sealing cap is also provided once again in the expansion chamber 14. To that end, the cap 76 is provided with a round metal plate 77 on its inside and is provided with an insulation 76, for instance made of a material such as a high-strength plastic, on its outside. The plate 77 with the cap 76 is pressed sealingly against the frame 24 with the aid of a tension component 79, which also includes a fusible component 80.

The tension component 79 has a tie rod or tension rod 81, and the fusible component 80 in this case is a fusible tension nut that can be screwed onto the tie rod 81. The tie rod 81 is disposed obliquely in the shaft 28. The tie rod 81 is supported at one end in a bearing on the cap 76 and on the other end the fusible tension nut is countersupported in a bearing in the region of the floor through the fusible tension nut 80. A bracket 82 which is provided as the countersupport is secured to the reinforcing frame 22 in the region of the antechamber 10. The tie rod 81 leads obliquely through the serpentine granulate bushing 30.

Figure 6:
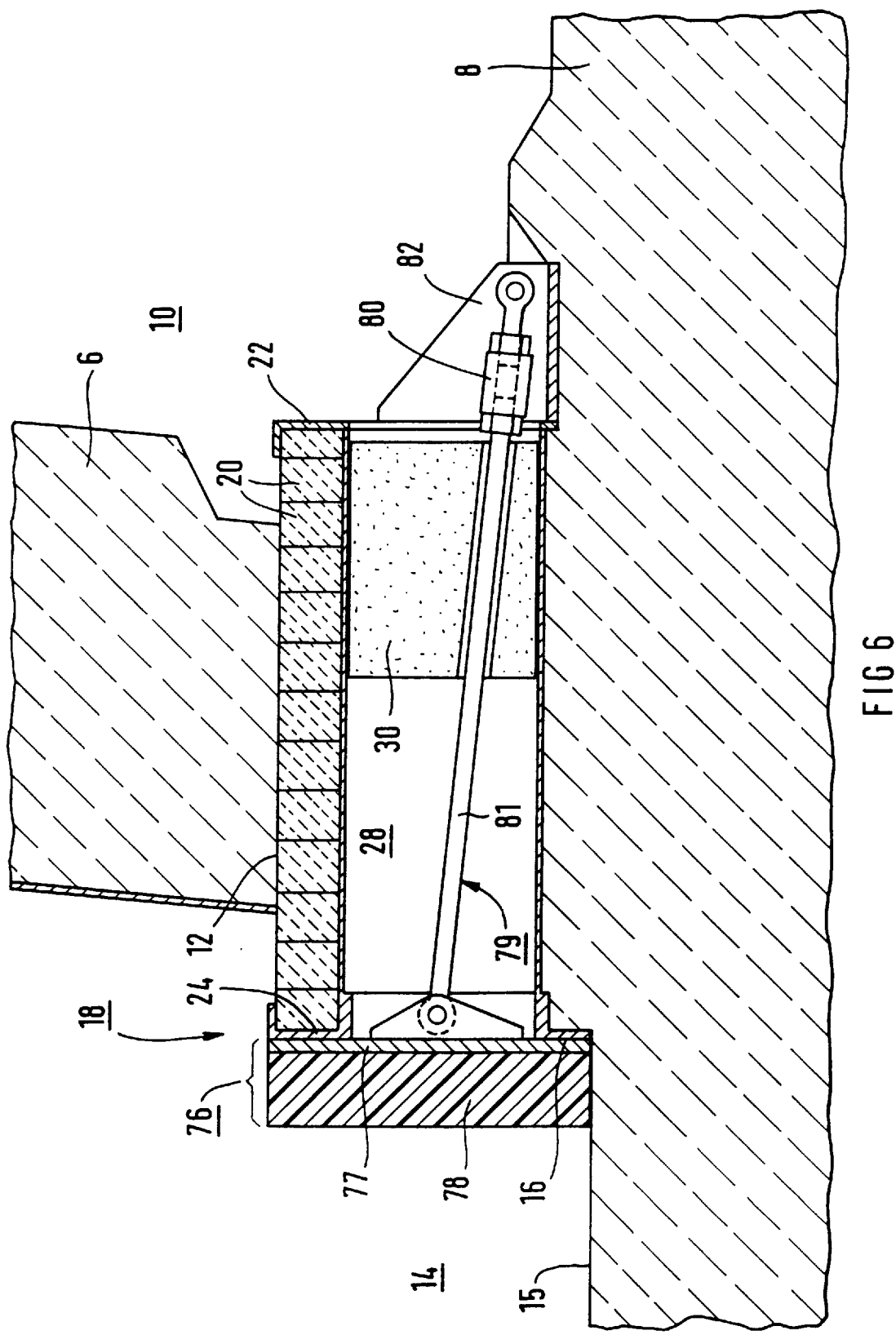
FIG. 6 is a view similar to FIG. 1 of a sixth such device, with a fusible tension nut as the tripping element.

With respect to FIG. 6, the following can thus be said: the fusible sealing cap 76 is tightened against the sealing flange 24 at the outlet opening through the use of the tie rod 81. The tie rod 81 has a fusible tension nut 80, which is disposed on the side of the outlet channel or shaft 28 facing toward the supply chamber 10. This fusible tension nut 80 is melted open when it comes into contact with the reactor-meltdown products. The tension is lost, and the fusible sealing cap 76 can open. The reactor-meltdown products can then pass either into the dry expansion chamber 14 or can pass over into the water path in the case of a so-called wet structure.

It is significant that the fusible sealing cap 76 has the insulation 78 on its outside. If water is located in the expansion chamber 14, which may be planned or may be caused by an accident, then the fusible sealing cap 76 is not cooled by this water, which assures reliable melting through of the metal plate 77.

Figure 7:
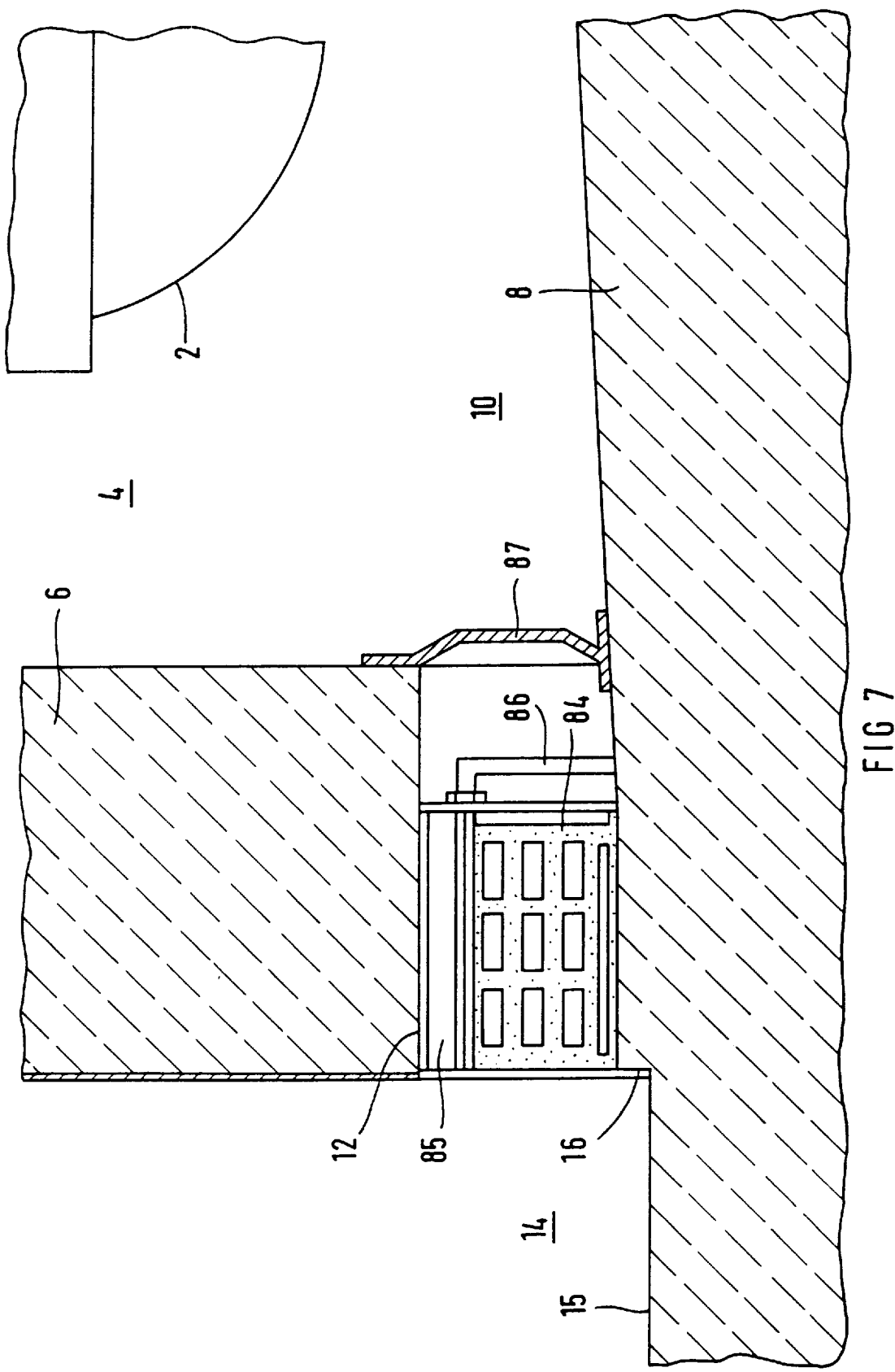
FIG. 7 is a view similar to FIG. 1 of a seventh such device, with a fusible tension nut as an igniter.

In the embodiment shown in FIG. 7, a chemical reagent 84 and a filler material 85 are disposed sealingly in the connection 12 between the antechamber 10 and the expansion chamber 14. The connection 12 is oblique in this embodiment. An igniter or fuse 86 for the reagent 84 is also accommodated in the portion of the connection 12 facing toward the reactor-meltdown product. This igniter 86 may preferably also be disposed partly above the reagent 84. Thermite is preferably used in this case as the chemical reagent 84. Concrete may be provided as the filler material 85. As a result of the use of thermite and an igniter 86 at least partly disposed on it, the chemical reagent 84 burns away from the top and first uncovers a certain passageway space for the reactor-meltdown products at the top. A cap 87, which in particularly is formed of metal, is sealingly disposed in the forward part of the connection 12.

The embodiment shown in FIG. 7 is suitable for both a wet and a dry expansion chamber 14, although the latter is preferred. The outlet channel 12 which passes through the load-bearing shield 6 is sealed off from pressure waves from the reactor pit 4 on the side of the reactor pressure vessel 2 through the use of the cap 87. Once the cap 87 has melted through as a result of the reactor-meltdown products, these products reach the igniter 86. The ignition of the thermite 84 then causes the melting of a melting location, which may in particular be constructed as a latticework. As a result, the connection 12 is cleared for the flow through of the reactor-meltdown products. These products can then pour into the expansion chamber 14. In the case of a wet structure, or in other words if the expansion chamber 14 is filled with water, the sealing location or place which is located there is monitored by a leak monitoring device, so that any seepage of water into the antechamber 10 can be detected.

Figure 8:
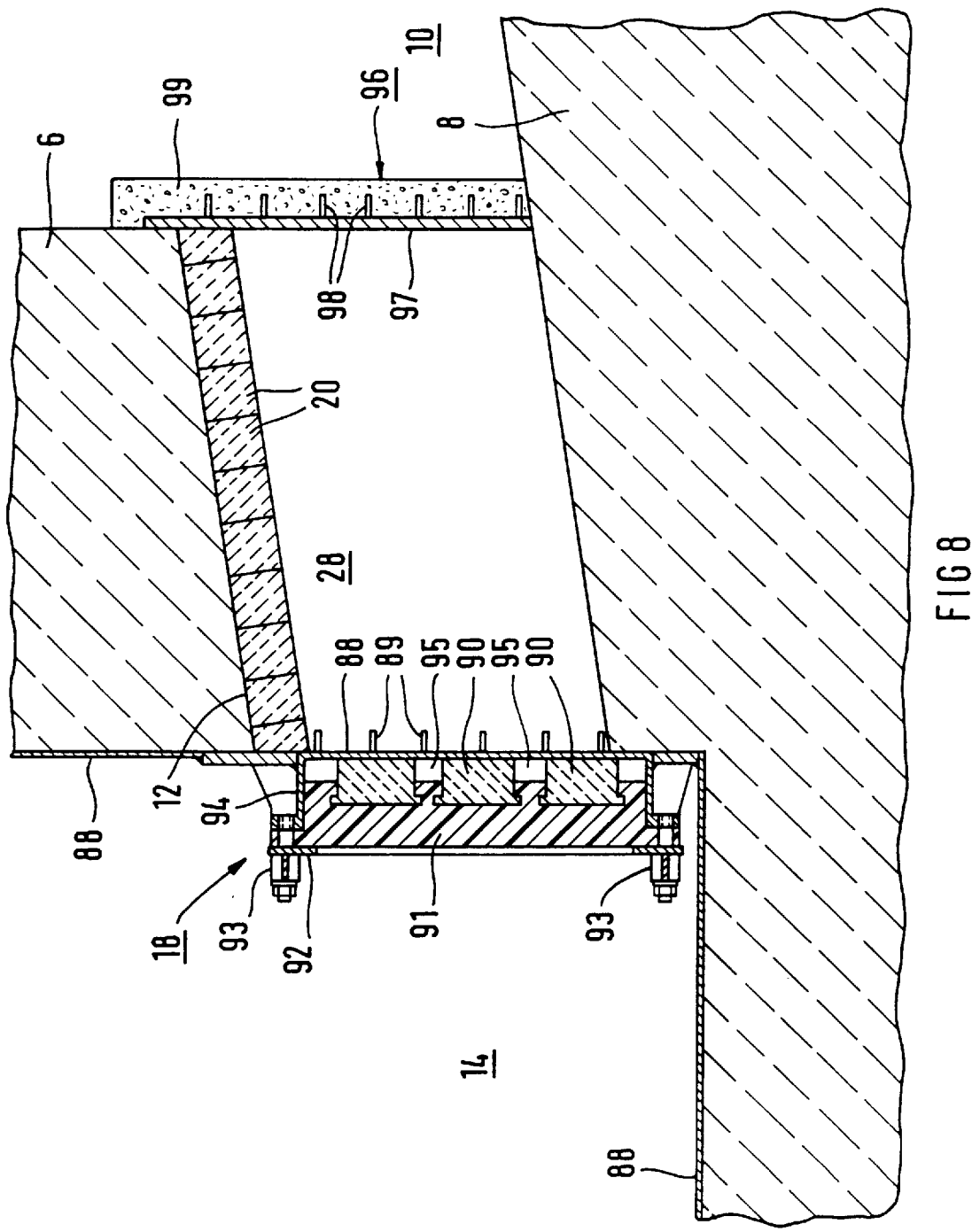
FIG. 8 is a view similar to FIG. 1 of an eighth such device, with a fusible tension nut as a thin metal plate.

In the embodiment of FIG. 8, the bulkhead 18 is formed substantially by a heat-insulated thin metal plate 88, which closes the connection 12. This metal plate 88 may in particular be formed of steel and it may be a lining or a metal liner which is provided in any case to line the chamber 14.

The metal plate 88 is provided with reinforcing ribs 89 in the region of the opening of the shaft 28. This is intended to prevent sagging, for instance from the invasion of water on the side of the expansion chamber 14. The metal plate 88 thus acts as a sealing bulkhead.

Spacer elements 90, which in particular may be formed of a ceramic, are mounted on the outside of the metal plate. The spacer elements 90 may have a cylindrical contour, for example. The spacer elements 90 are all covered by a round insulating body 91, which may preferably be formed of elastic rubber. This insulating body 91 has a protruding edge. A flange ring or fastening ring 92 rests on the outside of the insulating body 91. The insulating body 91 is kept in position and under initial stress by this flange ring 92. The flange ring 92 is braced through the use of tension screws 93 on an annular protrusion or counterflange 94, which is secured to the metal plate 88. Elements 92, 93, 94 form fastening means which firmly keep the insulating body 91 spaced apart from and in front of the metal plate 88. The spacing is defined by the side-by-side spacer elements 90. A significant aspect is that water which may possibly be located in the expansion chamber 14 cannot cause cooling of the metal plate 88 to such an extent that the metal plate 88 is unable to melt through. Voids 95 which are visible in FIG. 8 contribute to the thermal insulation. It is thus assured that the insulating body 91 will not melt until the thin metal plate 88 has already melted.

It can also be seen from FIG. 8 that the shaft or expansion channel 28 is inclined toward the expansion chamber 14. A readily melting wall 96 is provided on the side of the antechamber 10. This wall may preferably be formed of a steel plate 97, which is equipped with ribs 98. On the outside, the steel plate 97 has a lining 99 of silicate concrete. This wall 96 seals off the entrance opening into the shaft 28. The wall 96 serves to intercept the pressure, for instance of 20 bar, in the event of failure of the reactor pressure vessel 2.

Once the reactor-meltdown products have reached the readily melting sealing wall 96, then once the protective layer 99 of silicate concrete has melted through, the steel plate 97 provided with the ribs 98 is also melted through. The melt or reactor-meltdown products then travel through the inclined shaft or outlet channel 28 to reach the opposed metal plate 88 with the rein forcing ribs 89. The reactor-meltdown products melt it through, and then the insulating body 91 is melted open. This opens the flange seal. The ceramic spacer elements 90 acting as insulators prevent premature failure of the insulating body 91 during the melting open of the metal plate 88. This is because it has been found to be important to ensure that the metal plate 88 not be allowed to be cooled by any water possibly located in the expansion chamber 14. The spacer elements 90 and the air cushions located in the intervening voids 95 have a good insulating action, so that the reverse cooling referred to is precluded.

Figure 9:
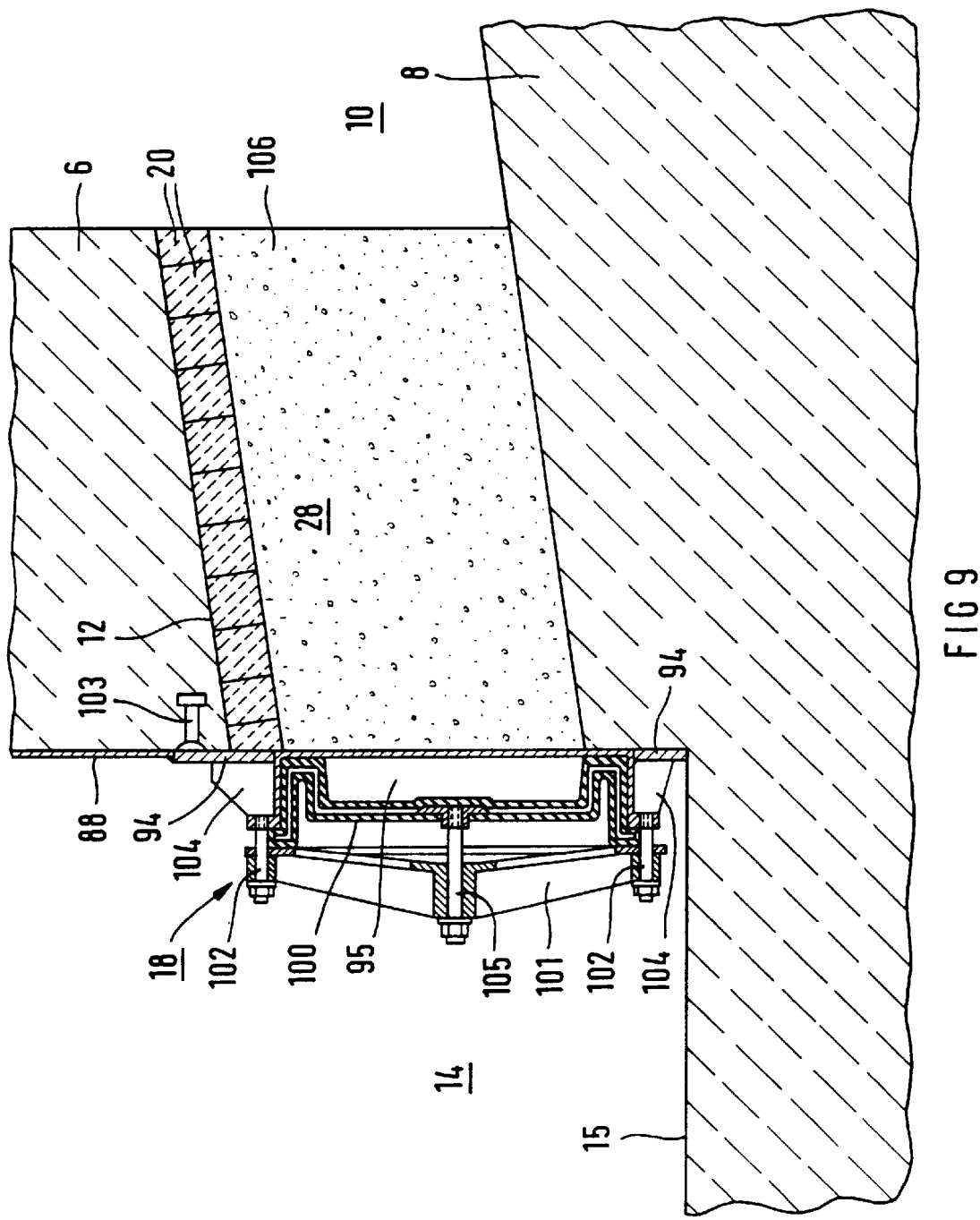
FIG. 9 is a view similar to FIG. 1 of a ninth such device, again with a thin metal plate as the tripping element.

In the embodiment of FIG. 9, the bulkhead 18 is formed by a thin metal plate 88, which once again may in particular already be present in the form of a metal lining or as a liner. This metal plate 88 is disposed in such a way that it closes the connection 12 on the side of the expansion chamber 14. The bulkhead 18 also has a hollow insulating body 100, which in this case is preferably cup-shaped. The insulating body has a fastening edge. Fastening means, which are described in further detail below, are also provided to firmly hold the insulating body 100 in front of the metal plate 88. It is important to ensure that the insulating body 100 either already have a void 95 and in particular an air chamber, or form one together with the metal plate 88 upon being pressed against the metal plate 88. The second of these options is chosen in this case. The air chamber in this case serves the purpose of thermal insulation.

The insulating body 100 also has insulating properties. It preferably is formed of a reinforced rubber.

The aforementioned fastening means include a reinforcing body 101, which in this case is constructed as a tripod. The tripod has legs which are screwed to the metal plate 88, with the aid of screw bolts 102 and with the interposition of an edge of the insulating body 100. The insulating body 100 thus rests sealingly on the metal plate 88. For securing purposes, flanges 94 are used which are secured to the load-bearing shield 6 through concrete anchors 103. The fastening means also include sheet-metal reinforcements 104, which are disposed on the flange 94.

The center of the tripod 101 may be connected to the center of the cup-shaped insulating body 100 by a screw bolt 105. This assures that the pressure of the water which is possibly present in the expansion chamber 14 cannot compress the void or air chamber 95 far enough to make it thermally ineffective.

A readily melting plug 106 is disposed in the shaft 28. By way of example, the plug may be formed of a silicate concrete.

The following can be said about the embodiment of FIG. 9: the outlet channel or shaft 28 which is inclined in the direction of the expansion chamber 14 is filled with the plug 106 formed of the readily melting material, in order to transmit the pressure on the side of the shielding pit 4. On the side of the expansion chamber 14, the metal plate 88, which is preferably a steel plate, is installed as a sealing bulkhead. The outside of the insulating body 100 is centrally held with the reinforcing body 101 in order to create the air chamber 95. The insulating body 100 is sealed off at its periphery against the flange 94.

Once the easily melting plug 106 has melted through, the reactor-meltdown products reach the thin metal plate 88, which is not cooled due to the presence of the air cushion 95 having an insulating action, and therefore the thin metal plate 88 melts open. It is thus assured that the insulating body 100 will not fail prematurely. Next, the insulating body 100 is opened, and the reactor-meltdown products flow into the expansion chamber 14.

We claim:

1. A device for collecting reactor-meltdown products from a reactor pressure vessel, comprising:

a) an antechamber disposed below a reactor pressure vessel;

b) an expansion chamber having a floor forming an expansion surface for reactor-meltdown products; and c) a bulkhead being disposed between said antechamber and said expansion chamber and being destructible by the reactor-meltdown products, said bulkhead having parts including at least one thermally destructible part being thermally destroyed by the reactor-meltdown products and including at least one other non-thermally destructible part supported by said at least one thermally destructible part until the reactor-meltdown products melt said at least one thermally destructible part for creating a flow path for the reactor-meltdown products from said antechamber into said expansion chamber upon thermal destruction of said at least one thermally destructible part resulting in the collapse of said at least one other non-thermally destructive part.

2. The device according to claim 1, including a connection from said antechamber to said expansion chamber, said bulkhead having a cap and a fusible screw sealing said cap in said connection.

3. The device according to claim 2, wherein said connection has an outlet opening, and including a tie rod sealing said cap at said outlet opening along with said fusible screw.

4. The device according to claim 3, wherein said connection has an inlet opening, and said fusible screw is a component of a countersupport being disposed at said inlet opening.

5. The device according to claim 4, wherein said countersupport includes a tripod.

6. The device according to claim 2, wherein said cap has a number of thin-walled tubes and a sheet-metal housing enclosing said tubes.

7. The device according to claim 1, including a connection from said antechamber to said expansion chamber, said bulkhead having a cap and a fusible bearing bolt sealing said cap in said connection.

8. The device according to claim 7, wherein said connection has a sealing surface, and said cap is disposed inside said connection and is pressed from inside against said sealing surface by said fusible bearing bolt.

9. The device according to claim 8, wherein said sealing surface is a conical sealing surface inside said connection, and said cap rests on said conical sealing surface.

10. The device according to claim 7, including a thrust rod connecting said cap to said fusible bearing bolt.

11. The device according to claim 7, including a metal lining inside said connection, said fusible bearing bolt being secured to said metal lining.

12. The device according to claim 11, including two eyelets securing said fusible bearing bolt to said metal lining.

13. The device according to claim 10, wherein said thrust rod has a tension member, and said cap has an opening formed therein for actuating said tension member from said expansion chamber 14.

14. The device according to claim 1, including a connection from said antechamber to said expansion chamber, said bulkhead having at least one cap and a bolt welded into a fusible seam for sealingly securing said at least one cap into said connection.

15. The device according to claim 14, including a sealing body in said connection, said at least one cap being braced against said sealing body.

16. The device according to claim 15, wherein said sealing body is annular.

17. The device according to claim 14, including a further cap, said bolt being a screw bolt passing through said further cap and having a side facing toward said expansion chamber with a mounting nut on said side.

18. The device according to claim 14, wherein said bolt is disposed approximately centrally in said at least one cap.

19. The device according to claim 1, including a connection from said antechamber to said expansion chamber, said bulkhead having a closing cap and a sheath being connected to said closing cap for sealingly securing said closing cap into said connection, said sheath being at least one of a fusible sheath and a sheath connection constructed as a fusible connection.

20. The device according to claim 19, wherein said closing cap has an edge, and including a seal in said connection, said edge of said closing cap being braced against said seal.

21. The device according to claim 20, wherein said seal is annular.

22. The device according to claim 19, wherein said closing cap has a central part being constructed as a fusible sheath.

23. The device according to claim 19, wherein said bulkhead has an additional cap and a mounting screw securing said additional cap to said closing cap.

24. The device according to claim 23, wherein said additional cap has a number of thin-walled tubes and a sheet-metal housing enclosing said tubes.

25. The device according to claim 23, wherein said additional cap has a cantilevered arm and a weight on said cantilevered arm.

26. The device according to claim 1, including a connection from said antechamber to said expansion chamber, said bulkhead having a frame disposed at said connection, a cap, a countersupport and a connecting element with a fusible component between said cap and said countersupport, said cap being sealingly braced from outside against said frame and said countersupport being braced from inside against said frame.

27. The device according to claim 26, wherein said countersupport includes a tripod.

28. The device according to claim 27, wherein said fusible component is a fusible sheath, and said connecting element has a bolt to be screwed together with said fusible sheath.

29. The device according to claim 28, wherein said tripod has a hub, and said fusible sheath is disposed in the vicinity of said hub.

30. The device according to claim 26, wherein said cap is a metal plate.

31. The device according to claim 26, wherein said cap is a round metal plate.

32. The device according to claim 26, wherein said cap has a cantilevered arm and a weight mounted on said arm.

33. The device according to claim 1, including a connection from said antechamber to said expansion chamber, said bulkhead having a frame disposed at said connection, a cap and a tension component with a fusible component, said tension component sealing said cap on said frame.

34. The device according to claim 33, wherein said tension component has a tie rod, and said fusible component has a fusible tension nut to be screwed onto said tie rod.

35. The device according to claim 34, including a shaft disposed in said connection, said tie rod being disposed obliquely in said shaft.

36. The device according to claim 33, wherein said tension component has one end supported on said cap and another end countersupported in the vicinity of said floor.

37. The device according to claim 36, including a reinforcing frame and a bracket being secured as a countersupport on said reinforcing frame at said connection in the vicinity of said antechamber.

38. The device according to claim 33, wherein said cap is disposed on a side of said channel facing said expansion chamber.

39. The device according to claim 33, wherein said cap is constructed as a fusible sealing cap and has an insulation.

40. The device according to claim 1, wherein said bulkhead includes a filler material and a chemical reagent.

41. The device according to claim 40, wherein said bulkhead includes an igniter for said reagent.

42. The device according to claim 40, wherein said reagent is thermite.

43. The device according to claim 41, wherein said igniter is at least partially disposed on said reagent.

44. The device according to claim 40, wherein said filler material is concrete.

45. The device according to claim 1, including a connection from said antechamber to said expansion chamber, said bulkhead including a thin metal plate closing said connection, an insulating body, at least one spacer element, and fastening means firmly holding said insulating body at a location being in front of and spaced apart from said metal plate by a given distance being defined by said at least one spacer element.

46. The device according to claim 45, wherein said thin metal plate has reinforcement ribs.

47. The device according to claim 45, wherein said metal plate is formed of steel.

48. The device according to claim 45, wherein said insulating body is formed of rubber.

49. The device according to claim 45, wherein said spacer element is formed of ceramic.

50. The device according to claim 45, wherein said metal plate is formed of steel, said insulating body is formed of rubber and said spacer element is formed of ceramic.

51. The device according to claim 45, wherein said fastening means include a fastening ring and several screws.

52. The device according to claim 45, including a readily fusible wall disposed at a side of said connection facing said antechamber.

53. The device according to claim 52, wherein said fusible wall includes a steel plate having ribs.

54. The device according to claim 1, including a connection from said antechamber to said expansion chamber, said bulkhead including a thin metal plate closing said connection, a hollow insulating body, fastening means firmly holding said insulating body in front of said metal plate and at least one air chamber for thermal insulation.

55. The device according to claim 54, wherein said air chamber is formed between said insulating body and said metal plate.

56. The device according to claim 55, wherein said insulating body is cup-shaped.

57. The device according to claim 54, wherein said metal plate is formed of steel.

58. The device according to claim 54, wherein said insulating body is formed of a reinforced rubber.

59. The device according to claim 54, wherein said metal plate is formed of steel and said insulating body is formed of a reinforced rubber.

60. The device according to claim 54, wherein said fastening means include a reinforcement body sealingly securing said insulating body to said metal plate.

61. The device according to claim 60, wherein said reinforcement body is a tripod.

62. The device according to claim 54, including a load-bearing shield in which said connection is disposed, said fastening means having a flange being secured to said load-bearing shield.

63. The device according to claim 54, including a shaft disposed in said connection, and a readily fusible plug disposed in said shaft.

64. The device according to claim 1, wherein said expansion chamber is disposed laterally of said antechamber.

* * * * *